United States Patent
Bala et al.

(10) Patent No.: US 12,547,651 B2
(45) Date of Patent: Feb. 10, 2026

(54) SYSTEMS AND METHOD FOR DYNAMICALLY UPDATING MATERIALITY DISTRIBUTIONS AND CLASSIFICATIONS IN MULTIPLE DIMENSIONS

(71) Applicant: TRUVALUE LABS, INC., San Francisco, CA (US)

(72) Inventors: Greg Paul Bala, San Francsico, CA (US); James Cardamone, San Francsico, CA (US); Thomas Kuh, San Francsico, CA (US); Adam Salvatori, San Francsico, CA (US); Nicole Stelea, San Francsico, CA (US)

(73) Assignee: TRUVALUE LABS, INC., San Francisco, CA (US)

( * ) Notice: Subject to any disclaimer, the term of this patent is extended or adjusted under 35 U.S.C. 154(b) by 308 days.

(21) Appl. No.: 18/034,007

(22) PCT Filed: Oct. 26, 2021

(86) PCT No.: PCT/US2021/056653
§ 371 (c)(1),
(2) Date: Apr. 26, 2023

(87) PCT Pub. No.: WO2022/093822
PCT Pub. Date: May 5, 2022

(65) Prior Publication Data
US 2023/0409618 A1 Dec. 21, 2023

Related U.S. Application Data

(60) Provisional application No. 63/105,802, filed on Oct. 26, 2020.

(51) Int. Cl.
*G06F 16/334* (2025.01)
*G06F 16/3332* (2025.01)
(Continued)

(52) U.S. Cl.
CPC ...... *G06F 16/3344* (2019.01); *G06F 16/3334* (2019.01); *G06F 16/338* (2019.01); *G06F 40/295* (2020.01); *G06F 40/30* (2020.01)

(58) Field of Classification Search
CPC ............ G06F 16/3334; G06F 16/3344; G06F 16/338; G06F 40/295; G06F 40/30
See application file for complete search history.

(56) References Cited

U.S. PATENT DOCUMENTS 8,156,073 B1 * 4/2012 Dave ................. G06F 16/285
707/754
8,204,809 B1   6/2012 Wise
(Continued)

OTHER PUBLICATIONS

International Search Report and Written Opinion dated Feb. 8, 2023 filed in PCT/US2021/056653.
(Continued)

*Primary Examiner* — Eric Yen
(74) *Attorney, Agent, or Firm* — HUNTON ANDREWS KURTH LLP

(57) ABSTRACT

The present disclosure refers to a data processing and retrieval method for dynamically assessing materiality of a signal. A method comprises receiving a list containing a plurality of entities of interest and a plurality of features of interest. Additionally, a plurality of documents containing text describing the features of interest related to the entities of interest can be provided. The method then measures performance of the entities of interest relative to the features of interest.

20 Claims, 9 Drawing Sheets

(51) Int. Cl.
  *G06F 16/338*   (2019.01)
  *G06F 40/295*   (2020.01)
  *G06F 40/30*    (2020.01)

(56) References Cited

U.S. PATENT DOCUMENTS

| | | | |
|---|---|---|---|
| 9,646,075 B2 | 5/2017 | Riggs | |
| 9,899,036 B2* | 2/2018 | Bilobrov | H04R 3/04 |
| 2007/0299862 A1* | 12/2007 | Aggarwal | G06F 16/40 |
| | | | 707/999.102 |
| 2008/0183519 A1 | 7/2008 | Nigel et al. | |
| 2010/0094840 A1* | 4/2010 | Donnelly | G06Q 30/02 |
| | | | 707/E17.061 |
| 2017/0091847 A1* | 3/2017 | Cama | G06Q 50/01 |
| 2017/0161277 A1 | 6/2017 | Eulenstein et al. | |
| 2017/0339168 A1* | 11/2017 | Balabine | G06F 16/951 |
| 2018/0032636 A1* | 2/2018 | Mullaney | G06N 5/022 |
| 2019/0251637 A1 | 8/2019 | Schlueter et al. | |
| 2019/0392330 A1* | 12/2019 | Martineau | G06N 3/042 |
| 2020/0027047 A1 | 1/2020 | Aaron et al. | |

OTHER PUBLICATIONS

European Search Report dated Sep. 26, 2024 filed in EP 21887341. 2, 7 pages.
Australian Examination Report dated May 27, 2025 issued in AU Patent Application No. 2021370972, 3 pages.

* cited by examiner

SYSTEMS AND METHOD FOR DYNAMICALLY UPDATING MATERIALITY DISTRIBUTIONS AND CLASSIFICATIONS IN MULTIPLE DIMENSIONS

CROSS-REFERENCE TO RELATED APPLICATIONS

This application relates to and claims priority from U.S. Patent Application No. 63/105,802 filed on Oct. 26, 2020, the entire disclosure of which is incorporated herein by reference.

FIELD

The present disclosure relates to data processing and retrieval to dynamically assess materiality of a signal to subsets of industries or entities.

BACKGROUND

Many asset managers have developed their own proprietary view of what Environmental Social and Governance (ESG) data is material to their decisions. However, the limitation of these frameworks is that they are not able to dynamically adjust to market conditions to show how issues are emerging as material. Additionally, these frameworks are not able to identify at a company level what ESG issues are material for a specific company. Still further, these frameworks may be unable to identify issues that are material in a geographic region, in an industry, or in a size grouping.

Various signals may or may not yield materiality of a given industry or entity. Additionally, signals that were immaterial a decade, a year, or a month ago may be material today. Existing approaches to assess materiality involve experts deciding in a static sense which aspects are pertinent based on their knowledge of a company's or industry's business at some time in the past. Existing approaches tend to overlook higher-paced changes and external factors affecting an industry or company. Decisions related to the company or industry and made based on the existing approach, especially those related to external investment, are rendered less accurate for two reasons 1) materiality is assessed at a speed insufficient to assimilate rapid changes in external conditions, and 2) companies each have their own unique makeup and therefore may not fit neatly into one specific industry designation.

Just as materiality of signals may change with time, entity classifications may evolve as well. Existing entity classification and categorization techniques have shortcomings similar to conventional materiality assessments. Existing classification systems tend to be static and thus inherently inaccurate as time moves forward and entities, industries, sectors, and regions evolve. Classification systems typically do not adapt with agility to newer peers, industries, and sectors for a given entity. Furthermore, existing classification approaches may associate an entity with only one industry and sector even though the entity might be a rightful constituent of many industries or sectors. Using existing static frameworks may result in more complex relationships such as regional trends being lost.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the illustrations.

DETAILED DESCRIPTION

Figure 1:
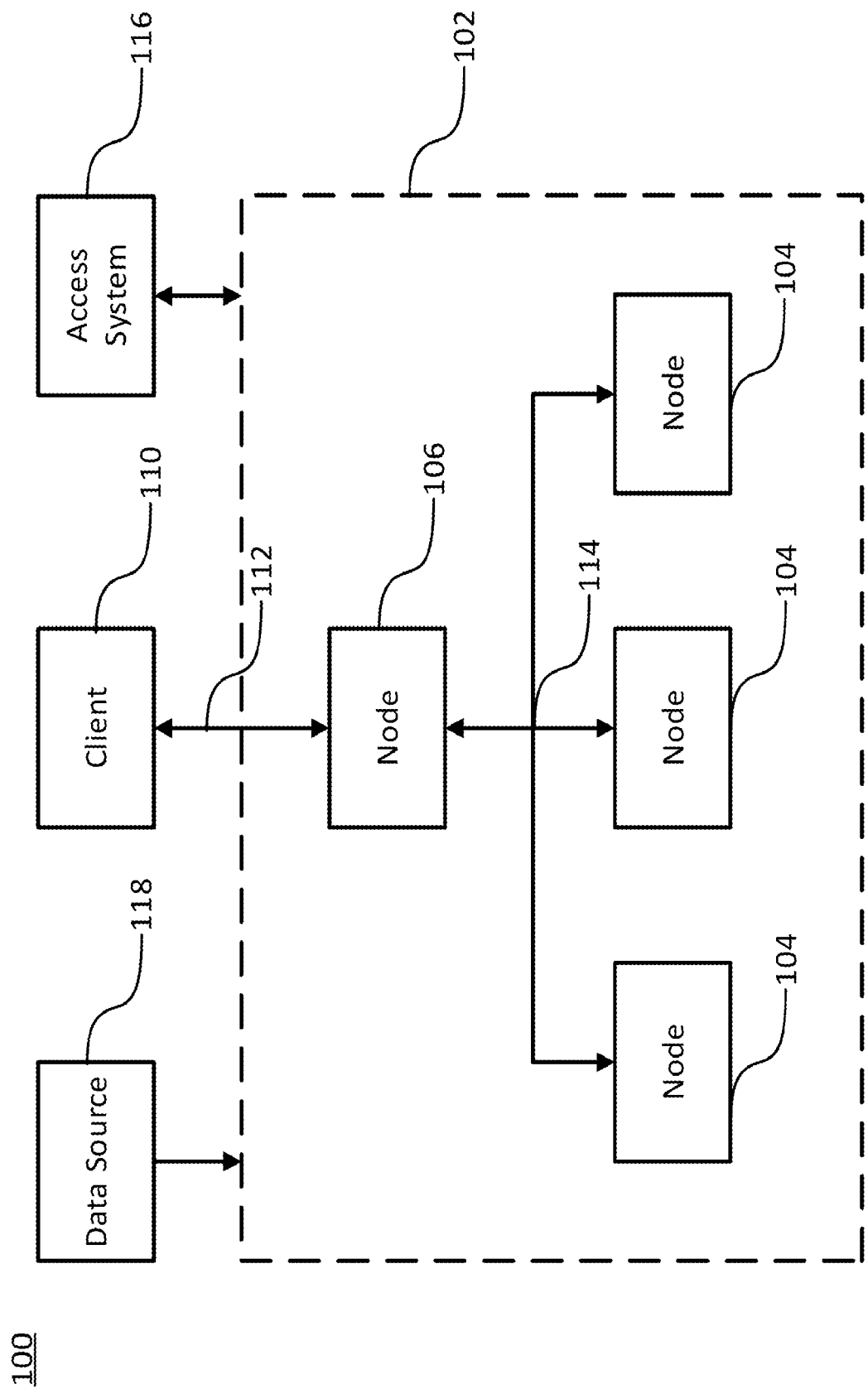
FIG. 1 illustrates an exemplary architecture for ingesting, processing, writing, and reading unstructured data sets, in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized, and that logical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Additionally, any reference to without contact (or similar phrases) may also include reduced contact or minimal contact.

Furthermore, any reference to singular includes plural embodiments, and any reference to more than one component may include a singular embodiment. As used herein, the term "unstructured data sets" may refer to partially or fully unstructured or semi-structured data sets including irregular records when compared to a relational database. An unstructured data set may be built to contain observables suitable for natural language processing. Observables for systems and methods of the present disclosure include journal articles, news articles, periodical publications, segments of books, bibliographical data, market data, social media feeds, converted videos, or other publications relevant to an entity or group of entities. An unstructured data set may be compiled with or without descriptive metadata such as column types, counts, percentiles, custom scoring and/or other interpretive-aid data points.

As used herein, the term "entity" may describe corporate entities, asset classes, municipalities, sovereign regions, brands, countries, geographic locations, recursively groups of entities (such as industries or sectors themselves) or other items related to or referenced by text, video, or audio content ingested into systems and methods of the present disclosure. The term "categorization" may refer to the action by which the systems and methods described herein classify an entity. The term "real-time" may refer to a time period ranging from instantaneous to nearly instantaneous. For example, real-time results may include results served within a fraction of a second, within 5 seconds, within 10 seconds, or even under a minute in some contexts.

The term "signal" may refer to a topic or criteria on which the systems and methods described herein evaluate an entity. For example, systems and methods described herein may negatively score a corporation's data security signal based on news coverage of a data breach event where the corporate entity exposed personally identifiable information. In that regard, systems and methods of the present disclosure may assess and quantify Environmental, Social, and Governance (ESG) signals (or other signals derivable from content of interest) related to entities of interest. ESG signals and other signals can arise in data published by news sources, for example. These signals may then enable the capture of "externalities" that impact public perception, generate costs, and/or generate benefits borne outside an entity such as a company. The externalities may not be priced into a company's value.

The term "ESG materiality factor" refers to a multi-factor materiality model that considers and measures how the industry, region, and company size change the materiality of categories. Examples of ESG materiality factors may include domicile of an entity, principal place of business of a company, industry of a company, sector classification of a company, or market cap of a company (small, mid, large).

Systems and methods of the present disclosure may assess and ESG signals related to entities of interest based on various frameworks. Examples of suitable frameworks may include the materiality framework endorsed by the Sustainability Accounting Standards Board (SASB) and described at https://www.sasb.org/standards-overview/materiality-map/. Another exemplary framework for assessing ESG signals is the Sustainable Development Goals (SDG) as described by the United Nations at https://www.un.org/sustainabledevelopment/sustainable-development-goals/. Still another exemplary framework for assessing ESG signals might be one endorsed by the Task Force on Climate-related Financial Disclosures (TCFD) available at https://www.fsb-tcfd.org/. ESG signals may thus be evaluated to assess whether a company's behavior tend to align with or deviate from the principles of each framework.

With reference to FIG. 1, a distributed file system (DFS) 100 is shown, in accordance with various embodiments. DFS 100 comprises a distributed computing cluster 102 configured for parallel processing and storage. Distributed computing cluster 102 may comprise a plurality of nodes 104 in electronic communication with the other nodes as well as a control node 106. Processing tasks may be split among the nodes of distributed computing cluster 102 to improve throughput and enhance storage capacity, with each node capable of indexing data stored on its local resources. Distributed computing cluster 102 may leverage computing resources and software tools of modern data centers such as those offered by Amazon Web Services (AWS) or Microsoft Azure, for example. Distributed computing cluster 102 may also be a stand-alone computing array with some of nodes 104 comprising a distributed storage system and some of nodes 104 comprising a distributed processing system.

In various embodiments, nodes 104, control node 106, and client 110 may comprise any devices capable of receiving and/or processing an electronic message via network 112 and/or network 114. For example, nodes 104, node 106, or client 110 may take the form of a computer or processor, or a set of computers/processors, such as a system of rack-mounted servers. However, other types of computing units or systems may be used, including laptops, notebooks, hand held computers, personal digital assistants, cellular phones, smart phones (e.g., iPhone®, BlackBerry®, Android®, etc.) tablets, smart wearables, or any other device capable of receiving data over the network.

In various embodiments, client 110 may submit requests to control node 106. Control node 106 may distribute the tasks among nodes 104 for processing to complete the job intelligently. Control node 106 may thus limit network traffic and enhance the speed at which incoming data is processed. In that regard, client 110 may be a separate machine from distributed computing cluster 102 in electronic communication with distributed computing cluster 102 via network 112. A network may be any suitable electronic link capable of carrying communication between two or more computing devices. For example, network 112 may be local area network using TCP/IP communication or wide area network using communication over the Internet. Nodes 104 and control node 106 may similarly be in communication with one another over network 114. Network 114 may be an internal network isolated from the Internet and client 110, or network 114 may comprise an external connection to enable direct electronic communication with client 110 and the internet.

In various embodiments, data may be ingested and processed to generate outputs from inputs. In that regard, input variables may be mapped to output variables by applying data transformations to the input variables and intermediate variables generated from the input values. Nodes 104 may process the data in parallel to expedite processing. Furthermore, the transformation and intake of data as disclosed below may be carried out in memory on nodes 104. For example, in response to receiving a source data file of 100,000 records, a system with 100 nodes 104 may distribute the task of processing 1,000 records to each node 104 for batch processing. Each node 104 may then process the stream of 1,000 records while maintaining the resultant data in memory until the batch is complete for batch processing jobs. The results may be written, augmented, logged, and written to disk for subsequent retrieval. The results may be written to disks using various unstructured data storage formats.

In various embodiments, an access system 116 may be in electronic communication with distributed computing cluster 102 to facilitate access and retrieval of data in distributed computing cluster 102. Access system 116 may comprise, for example, a web server hosting a web interface for users to selectively engage with data stored in distributed computing cluster 102. The access system 116 may thus be capable of receiving and responding to HTTP requests from web browsers relating to authentication, user profiles, custom data filtering, custom data scoring, and otherwise interacting with web browsers. Access system 116 may also interact with a native application suitable for running on laptops, smartphones, personal computers, or other computing devices suitable for retrieving, displaying, manipulating, and sending data.

In various embodiments, data sources 118 may be in communication with computing cluster 102 for data ingestion. Data sources 118 may include targeted sources, aggregated sources, web-crawled sources, known reputable sources, or other sources suitable for ingestion into an unstructured data system. Data sources 118 may be a curated list of sources taking into consideration a white list of selected feeds, a blacklist of excluded feeds, or otherwise applying a criterion to selectively exclude data from ingestion and enhance the reliability of the ingested data. Data sources 118 may also include customer-specific data ingested for processing using preestablished lenses or custom lenses, or different aggregation and filter techniques.

In various embodiments, DFS 100 may aggregate categories or a subset of categories requested by a customer. DFS 100 may also process custom categories developed in response to customer requests to fulfill varying needs of end users. DFS 100 may also support multiple lenses such as SASB, SASB Materiality, SDG, or other suitable frameworks to analyze and score data in a manner consistent with the desired framework.

In various embodiments, DFS 100 may store data in a time series database to capture an ongoing timeline of an entity's events over time. DFS 100 may thus flexibly update and reprocess an entity's data accumulated over time in response to updated pipeline architecture, custom categories, newly identified signals, or other outputs yielded in part by processing and tagging entity data.

Figure 2:
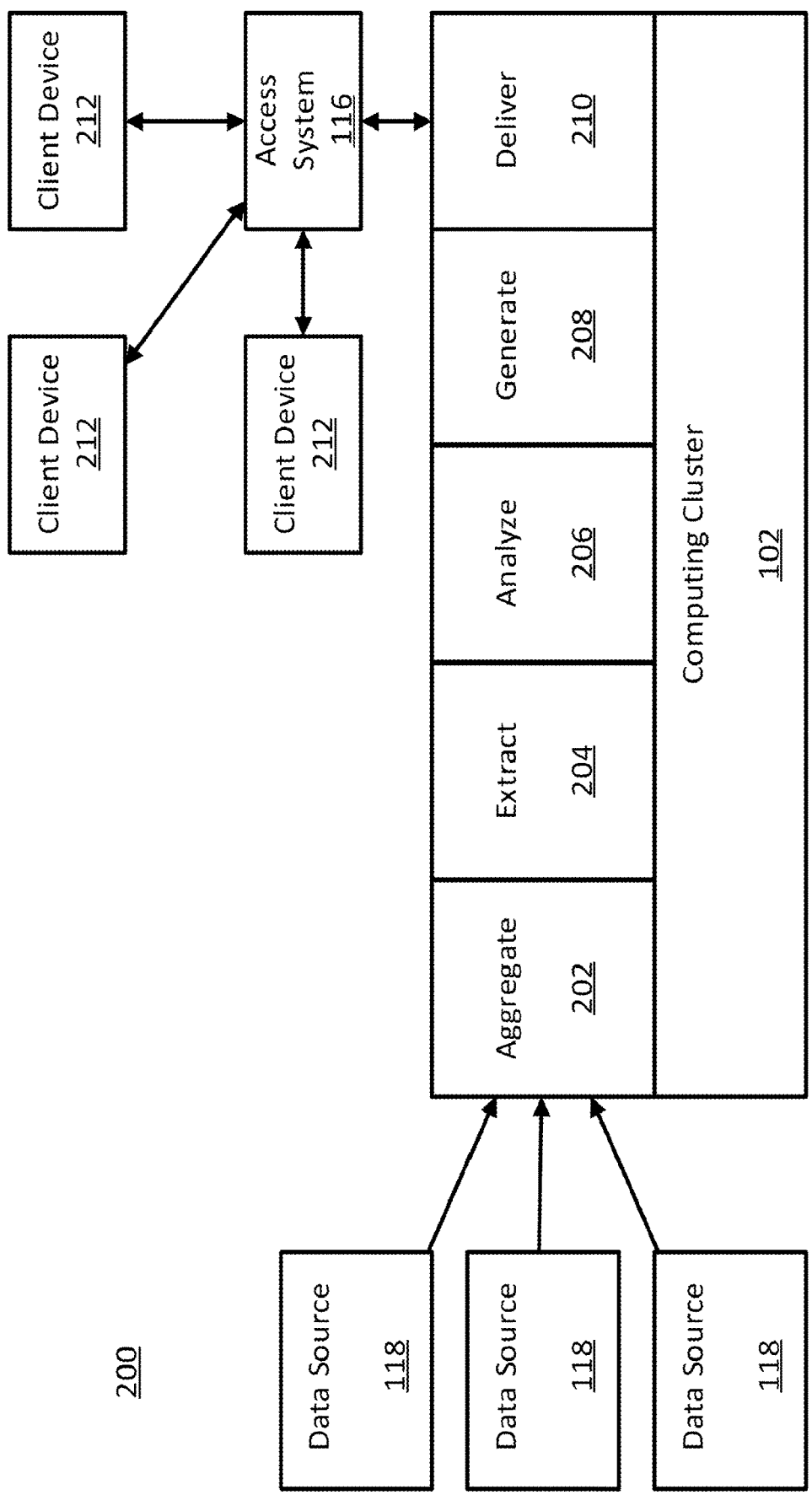
FIG. 2 illustrates an exemplary data flow ingesting text and/or image (still and moving) data from various news outlets, article sources, and content sources to support sentiment scoring and other predictive analytics for entities, in accordance with various embodiments.

With reference to FIG. 2, data flow 200 is shown for ingesting text, video, and audio information related to entities from news outlets, trade journals, social media, watchdogs, nongovernmental organizations, and other content sources to support sentiment scoring and predictive analytics related to signals or categories, in accordance with various embodiments. DFS 100 of FIG. 1 may use data flow 200 to ingest data and deliver results to end users. DFS 100 may maintain time series data as information is ingested over time resulting in an ongoing timeline of the entity's events over the entire data set. As events happen to the entity or as the entity evolves through corporate transitions, the flexibility of DFS 100 and data flow 200 allow data to be recalculated to reflect these changes. Reprocessed data may then reflect the updated state in downstream data points during delivery to end users.

In various embodiments, data sources 118 may feed into computing cluster 102 running an aggregation engine 202. Aggregation engine 202 may compile and preprocess data received electronically from various types of data sources. Aggregation engine 202 may accept data from targeted sources, aggregated data from aggregate sources, targeted web crawling from selected internet sources, RSS feeds, flat files, CSV files, JSON files, XML files, data backups, or other data sources capable of conveying text, audio, or video content related to entities. For example, aggregate engine 202 may accept text articles from a news aggregator or news outlet.

In various embodiments, content compiled by aggregation engine 202 may feed into extraction engine 204. Extraction engine 204 may sift through content by removing structure, converting audio and video to text, and otherwise eliminating unsuitable or undesirable content from data feeds. Extraction engine 204 may remove content by identifying undesirable patterns, structures, or content types such as, for example, raw data tables, images, unsupported languages, excluded terminology, resumes, forms, suggestive titles, excessive length, duplicative text, or stock reports. Extraction engine 204 may thus apply predefined criteria to content to exclude unreliable, inaccurate, unwanted, or disreputable sources. Extraction engine 204 may process the selected content to detect entities, detect signals, and score signal sentiment, which extraction engine 204 may tag for future retrieval and processing.

In various embodiments, analysis engine 206 may further operate on the content, detected entities, detected signals, and signal scores generated by extraction engine 204. Analysis engine 206 may parse content to detect events and identify entities, measure density, perform salience clustering, and assess volatility and confidence. For example, analysis engine 206 may identify that an oil spill occurred at Deepwater Horizon with news stories breaking starting Apr. 20, 2010, and analysis engine 206 may tag content covering the spills with an event identification to facilitate retrieval and analysis of articles associated with the event.

In various embodiments, analysis engine 206 may also parse content and assess materiality of signals by applying a materiality framework such as the materiality framework endorsed by SASB or the SDG described by the United Nations. In that regard, analysis engine 206 may weight signals related to an entity based on the materiality of a particular signal to the market segment or industry in which the entity operates, the size of the entity, the region of the world in which the entity operates.

In various embodiments, DFS 100 using data flow 200 may weigh scores by the data volume flowing through each category to further enhances a lens or framework (e.g., SASB or SDG) with a dynamic view of materiality. For example, DFS 100 tag incoming data relating to both the 26 SASB materiality categories and country of the subject entity. The SASB categories may be weighted differently by region based on volume of references in relation to entities in the region. The updated regional weights of the 26 SASB materiality categories may be used to dynamically model materiality for entities in the region.

In various embodiments, the dynamic view of materiality may be further enhanced by weighing scores by the data volume flowing through for each country or geographical region, for example, and applying the weighted scores to other entities in the same country or geographical region. The dynamic view of materiality may be further enhanced by weighing scores by the data volume flowing through for each company's market cap size (small, medium, large), for example, and applying the weighted scores to other entities in the same size category. The dynamic view of materiality may be further enhanced by weighing scores by the data volume flowing through for each company's industry or market segment, for example, and applying the weighted scores to other entities in the same industry or segment.

In various embodiments, generation engine of data flow 200 may generate entity scorecards, entity trends, portfolio monitoring, investment opportunities, and alpha in response to the data processed by extraction engine 204 and analysis engine 206. Content and metadata may pass from extraction engine 204 and analysis engine 206 as inputs into generation engine 208 in response to passing filter checks and meeting a threshold selected to balance recall (how much relevant content is selected) with precision (how much of selected content is relevant). Inaccurate or unreliable data may be filtered or omitted from the data set based on the filters and processing steps in extraction engine 204 and analysis engine 206.

In various embodiments, the data generated by extraction engine 204, analysis engine 206, and generation engine 208 may be suitable for end user consumption. Delivery engine 210 may package the data and content in a format suitable for consumption by an end user. For example, an end user operating client device 212 in electronic communication with access system 116 may request content packaged by delivery engine 210 for display locally on client device 212. In that regard, client device 212 may run a web browser in communication with a web server running on access system 116 and hosting the information packaged by delivery engine 210. Other suitable delivery methods may include, for example, an Application Programming Interface (API) or data streams such as flat files, CSV files, JSON files, XML files, RSS feeds, or other data communication medium suitable for delivering data to an end user.

Figure 3:
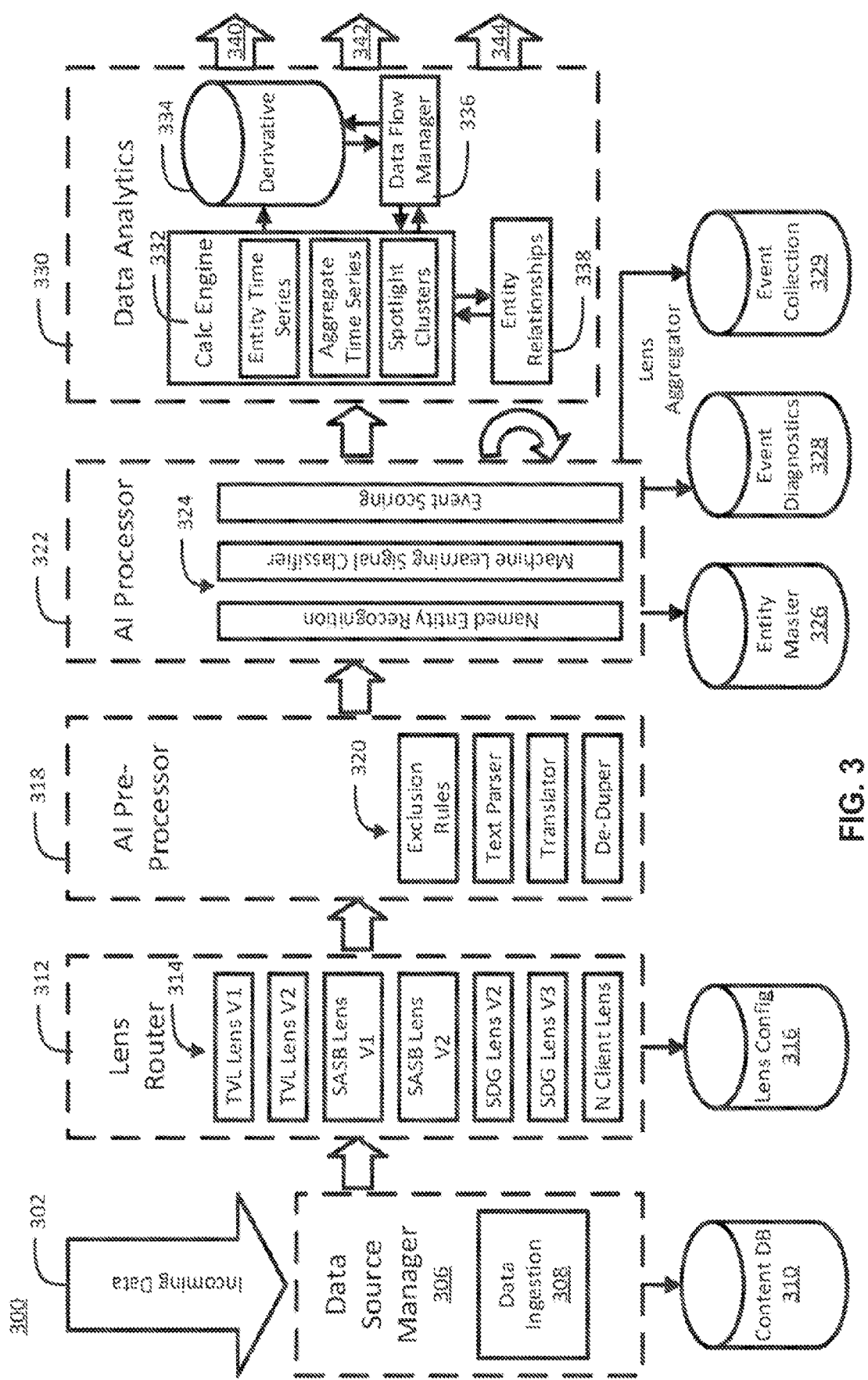
FIG. 3 illustrates an exemplary data pipeline architecture for processing data on a computer-based system in support of sentiment scoring and other predictive analytics, in accordance with various embodiments.

Referring now to FIG. 3, a data pipeline architecture 300 is shown suitable for execution using a computer-based system (e.g., DFS 100), in accordance with various embodiments. Data processing architecture 300 may by implemented on a big data system such as, for example, DFS 100 (of FIG. 1) by executing one or more steps at one or more node 104 or 106 (of FIG. 1). Data pipeline architecture may implement data flow 200 to ingest data and deliver analytics to end users. Data pipeline architecture 300 may receive incoming data 302 with a data source manager 306 to facilitate data ingestion 308. Incoming data 302 may comprise text, video, and/or audio information related to entities from news outlets, trade journals, social media, watchdogs, nongovernmental organizations, and/or other content sources. Incoming data 302 may come directly from originating news sources such as, for example, the New York Times® or Wallstreet Journal® in a digital format. An individual text, video, or audio news story or piece of data is referred to herein as a document. Incoming data 302 may also be collected by a third-party and packaged in a data feed. Incoming data 302 may also be retrieved by web crawlers or other active data collection techniques suitable for collecting content related to events and stories related to entities. Incoming data 302 may comprise a custom data set supplied by an end user seeking analysis of a particular data set.

In various embodiments, data source manager 306 may write the ingested data to a content database 310 and/or read data from content database 310. Content database 310 may retain data to facilitate reprocessing in the future using a revised architecture, applying different filtering rules, identifying additional signals, and otherwise supporting backward compatibility for future enhancements. Content database 310 may capture metadata relating to documents in incoming data 302 such as, for example, originating data source, date, author, title, body, or other data detectable during data ingestion 308. Data source manager 306 may thus perform steps and processing associated with aggregation engine 202 of FIG. 2.

In various embodiments, lenses may be applied to data to produce analytics formed or viewed differently depending on the lens applied. Lenses may be applied at any stage of processing or delivery. Lenses 314 may comprise various frameworks, processing paths, and incoming data implemented at various times. The lens router 312 may read and write lens configurations for each lens 314 to a lens configuration database 316.

In various embodiments, a lens router 312 may direct data into various processing paths depending for which of lenses 314 the incoming data 302 will be relevant. Lens router 312 may use metadata associated with a document to determine to which lenses a document is relevant. Lens router 312 may use, for example, originating data source, date, author, title, body, and/or other suitable data to route a document for further processing. Documents may be sent by lens router 312 to one lens, many lenses, or no lenses in response to metadata for documents matching a lens configuration. Lens router 312 enables data pipeline architecture 300 to scale with large data sets by limiting unnecessary processing as a result of routing data to relevant processing paths.

For example, Proprietary Lens V1 and Proprietary Lens V2 may comprise proprietary lenses where incoming data is processed and scored according to predetermined criteria. Proprietary Lens V1 may be built on a processing path that scores fewer or different signals than the Proprietary Lens V2 on overlapping but potentially different pools of incoming data 302. SASB Lens V1 and SASB Lens V2 may comprise lenses based on the SASB architecture. Ingested data may thus be routed into one or more processing paths corresponding to the lenses 314 to which the data is relevant.

Artificial Intelligence preprocessor 318 (AI preprocessor) of data pipeline architecture 300 may process documents and metadata from data ingestion, in accordance with various embodiments. AI preprocessor 318 may perform one or more preprocessing step 320. Preprocessing steps 320 may be applied based on processing paths selected by lens router 312. Preprocessing steps 320 may filter documents or otherwise place documents in condition for substantive processing. AI preprocessor may thus apply steps and processing associated with extraction engine 204 of FIG. 2.

In various embodiments, AI preprocessor 318 may apply exclusion rules as a preprocessing step 320. Documents may be excluded from further processing based on rules. AI preprocessor may exclude up to 90%, 95%, 97%, 98% or 99% of documents based on exclusion rules. For example, documents with the word "resume" in their title may be excluded from further processing. In another example, a document referencing two sports teams and a game score may be excluded from further processing. In still another example, a document from a third-party aggregated data source may be excluded because the underlying original publisher of the document is known to be unreliable.

In various embodiments, AI preprocessor 318 may apply text parsing rules as a preprocessing step 320. Text parsing rules may serve to clean the text of a document. For example, text parsing rules may strip embedded URLs, references, third-party directions, boilerplate text, advertisements, disclaimers, or other content irrelevant to the entity and event captured in the document. Text parsing rules may also apply image recognition or audio recognition to convert video or audio documents into text-based documents for further processing.

In various embodiments, AI preprocessor 318 may apply translation rules as a preprocessing step 320. Translation rules may detect and translate foreign language documents into the human language or languages used by data pipeline architecture 300 for text recognition, pattern matching, and AI processing. For example, AI preprocessor 318 may translate all documents into the English language to support further document processing and AI training using English-based rules.

In various embodiments, AI preprocessor 318 may apply de-duplication rules as a preprocessing step 320. Deduping may enable data pipeline architecture to detect and eliminate duplicate articles arriving in incoming data 302 from various sources.

Artificial Intelligence processor 322 (AI preprocessor) of data pipeline architecture 300 may process documents and metadata from AI preprocessor 318 that are cleaned and in condition for substantive processing to analyze relevant data and identify signals, in accordance with various embodiments. AI processor 322 may perform one or more processing step 324 to substantively evaluate a document and identify entities, events, signals, and other data points for presentation to an end user and/or further analysis. AI processor 322 may thus apply steps and processing associated with analysis engine 206 of FIG. 2.

In various embodiments, AI processor 322 may apply rules for named entity recognition as a processing step 324. Named entity recognition in processing steps 324 may include applying text recognition to detect known identifiers associated with an existing entity. Known entity identifiers such as tradenames, corporate names, corporate acronyms, or other identifiers for entities may be written to and read from entity master database 326. Documents may thus be attributed to the correct entity based on entity identifiers detected in the documents being associated with various entities. AI processor may store event diagnostics in event diagnostics database 328 and may run a lens aggregator to collect events in event collection database 329 to support various lenses.

In various embodiments, entity identifiers may include a time range during which the entity identifier is associated with a particular entity. Entity identifiers may be associated with different entities at different points in time as a result of corporate transactions such as mergers, sales, acquisitions, bankruptcies, dissolutions, brand launches, or other transactions though which an entity identifier might become associated or disassociated with entities. Named entity recognition may thus include using both an entity identifier and a date to associate a document with an entity. DFS 100 using data processing architecture 300 may thus tag unstructured data to companies on a point in time basis.

For example, Whole Foods® acquired Wild Oats Marketplace on Aug. 28, 2007, so on that date the entity identifier "Wild Oats Market" became associated with Whole Foods. Whole Foods was acquired by Amazon® on Aug. 29, 2017, so on that date the entity identifiers "Wild Oats Market" and "Whole Foods" became associated with Amazon. AI processor 322 may thus attribute to Amazon documents published after Aug. 29, 2017 and directed to an entity identified as "Wild Oats Market" or "Whole Foods." Named entity recognition is described further in reference to FIG. 4.

In various embodiments, AI processor 322 may include a machine learning signal classifier as a processing step 324. A machine learning signal classifier may use text recognition to identify signals in documents. Signals may comprise a topic and a sentiment relative to a framework. For example, AI processor 322 may identify a signal relating to forest fires in a document discussing behavior by Pacific Gas and Electric as a potential cause and as a result tag the forest fire signal and a negative sentiment to the document. AI processor 322 may be configured with rules to identify hundreds of signals relevant to various frameworks and/or lenses in documents.

In various embodiments, AI processor 322 may include event scoring as a processing step 324. Event scoring may include identifying an event relevant to a signal and an entity. For example, event scoring may detect that Apple® has created solar farms and reduced its carbon emissions, which is relevant to an emissions signal. Event scoring may then assess a direction (e.g., a positive sentiment or negative sentiment) associated with the event as well as a magnitude (e.g., greatly positive, slightly positive, neutral, slightly negative, or greatly negative) for the event. The magnitude may be normalized on a scale applied across all signals relevant to a framework.

In various embodiments, data processing architecture 300 may include data analytics 330, in accordance with various embodiments. Calc engine 332 may calculate analytics on signals and data received from AI processor 322. Calc engine 332 may calculate a time series for each entity tagged in one or more document in AI processor 322 during named entity recognition. Calc engine 332 may calculate an aggregate time series. Calc engine 332 may also identify spotlight clusters based on an increased volume of articles related to an incident.

Data processing architecture 300 may also comprise delivery mechanisms such as an application 340 for presentation and manipulation, APIs 342 for integration into custom client interfaces, or data feeds 344 for ingestion into client data sets. Delivery mechanisms of data processing architecture 300 may thus apply steps associated with delivery engine 210 of FIG. 2. Data processing architecture 300 ingests data, selectively processes data, and analyze data to generate signals associated with entities in various media. Calc engine 332 may write analytic results, entity time series, aggregate time series, spotlight clusters, and other data for output to clients to a derivatives database 334. Data flow manager 336 may read to and write from derivatives database 334 in communication with calc engine 332. Calc Engine 332 may read and write entity relationships 338 in response to natural language patterns identified in text of documents.

Figure 4:
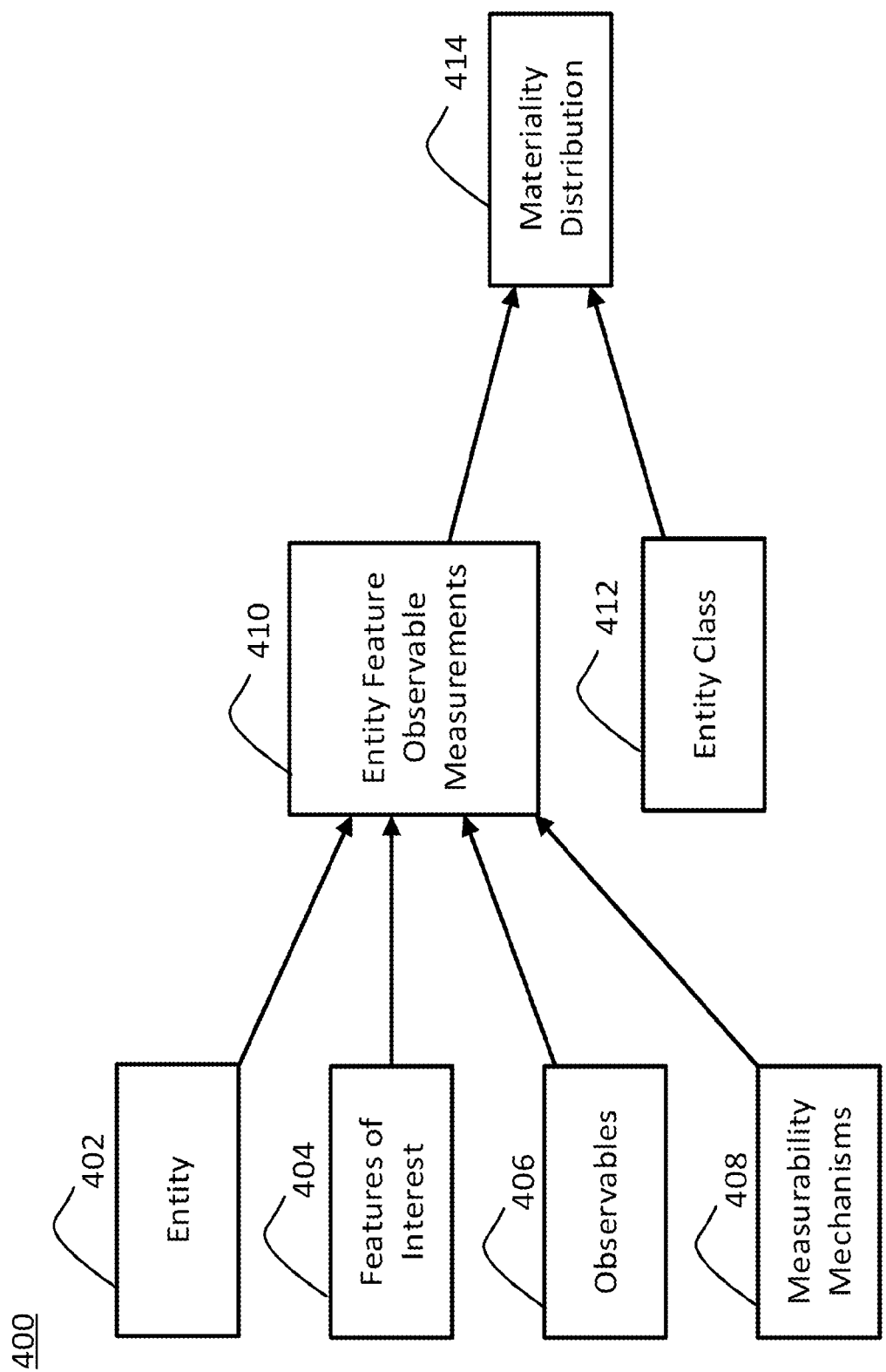
FIG. 4 illustrates an exemplary process for dynamically assessing materiality of features to an entity or group of entities, in accordance with various embodiments.

Referring now to FIG. 4, a process 400 for dynamically assessing materiality is shown, in accordance with various embodiments. Process 400 may run on distributed computing cluster 102 using data processing architecture 200 or a similar distributed computing infrastructure.

In various embodiments, distributed computing cluster 102 may select or otherwise identify an entity 402. Entity 402 may be an organization selected from a collection of organizations. For example, distributed computing cluster 102 may select entity 402 in response to entity 402 being a publicly traded company subject to incoming media referencing entity 402.

In various embodiments, distributed computing cluster 102 may identify or select features of interest 404. Features of interest 404 may be selected in response to being standardized areas or points of evaluation, behavioral observations, organizationally structural observations, categories of observations in corporate environmental stewardship, social impact, governance, and the like.

In various embodiments, distributed computing cluster 102 may identify or select observables 406 relevant to entity 402 and/or other entities from the collection at that point in time to be observed such as, for example, textual news articles, reports, still images, video images, and/or other observations. Observables 406 may be recordable on retrievable media, suitable for electronic communication across a network such as, for example, network 112 or network 114 of FIG. 1. Observables 406 may also arrive through natural input channels at aggregate engine 202 of FIG. 2.

In various embodiments, distributed computing cluster 102 may select or identify measurability mechanisms 408. Measurability mechanisms 408 may be known mechanisms to ascertain salient quantitative measurements from observables 406 related to the features of interest 404. Measurability mechanisms 408 may include, but are not limited to, applying known techniques for ascertaining the sentiment polarity and level articulated by a textual observable with respect to a feature of an entity. One example is the description of the degree of greenhouse gasses emitted from the operations of a company, netting a negative polarity, with a relative quantitative assessment of level based upon the linguistic superlatives used to describe the gas emission. Another example is the description of percentage of water sourced in company operations from regions with high water stress, netting a positive polarity, with a relative quantitative assessment of level based on linguistic descriptions of improvement relative to a previous period. Yet another example is the description of a labor negotiation, netting a negative polarity, with a relative quantitative assessment of level based on negative linguistic descriptions used to describe the likelihood of a work stoppage.

In various embodiments, distributed computing cluster 102 may apply methods such as natural language processing and image processing/visual feature characterization, apply the measurability mechanisms 408 to the observables 406 of entity 402 with respect to the features of interest 404 to produce the entity-feature-observable measurements 410.

In various embodiments, distributed computing cluster 102 may identify or otherwise retrieve entity class 412. Entity class 412 may be extracted from a classification system of entities, such as industry or sector classifications for companies. Distributed computing cluster 102 may tabulate the resulting entity-feature-observable measurements 410 corresponding to entity class 412 for each of the features of interest 404. Tabulations may include counting the existence of scores, averaging the scores, applying multidimensional clustering, and/or applying other statistical analysis techniques.

In various embodiments, dynamic materiality distributions 414 may coalesce over time as characterized by the tabulations, which may result in comparable numerical characterizations of magnitudes, significance, importance and the like of features of interest 404 within entity class 412. Process 400 may be repeated for various entity classes 412 and various entities 402 to assess a collection of entities. The result may comprise an articulation of dynamic materiality as a function of time. The dynamic materiality may then be updated as frequently as new observables appear in the input channels and is described below in greater detail with reference to FIG. 5.

Continuing with FIG. 4, a clustering of entities based on measurements upon observables 406 related to features of interest 404 may be made in a multidimensional space with each dimension representing one of the features of interest 404, in accordance with various embodiments. Each entity may be represented by a vector in the multidimensional space. Vectors in the multidimensional space may comprise magnitude such as a volume count of measurements upon observables related to features of interest 404 or entity classes 412. Clustered observables may be used to detect new entity classes that collect similar entities better than conventional classification systems and hierarchies. The new entity classes may also be characterized as combinations of the originally-input features of interest 404. Techniques to derive new entity classes or other insights may include agglomerative clustering, Euclidean clustering, principal component analysis and other clustering and re-categorizing techniques.

In various embodiments, techniques for dynamically assessing materiality may include tabulating volume of news related to an entity across categories and/or uniquely evaluating an entity across categories by news volume to create an entity signature. The entity signature may be used to identify similarities and/or differences between entities, or between the same entity at different points in time. A distance matrix may be created to be applied to agglomerative clustering, for example. A Euclidean cluster may also be created for the space with each dimension representing one of the features of interest 404. The results may be used in self-assessment to measure overlap with existing approaches and differences with existing approaches.

In various embodiments, techniques for dynamically assessing materiality may include consideration of company size or value as measured by number of employees, market capitalization, enterprise value, or other measurements. Dynamic materiality calculations and assessment might change in circumstances including, but not limited to, if a company is predicted or expected using size or valuation measurements to have insufficient volume to render the primary dynamic materiality calculation and assessment meaningful. Other useful applications of the comparison between company or entity volume and measurements of company or entity size or value may exist, and this concept may be extended recursively to industries, sectors, or other clusters.

In various embodiments, techniques for dynamically assessing materiality may include tabulating volume of news related to an entity across categories. Dynamic materiality assessments may comprise relative measurements of categories to each other for one company or entity, industry, sector, or other suitable grouping.

In various embodiments, techniques for dynamically assessing materiality may include tabulating volume of news related to an entity and one category and comparing that entity-category combination's news volume to the total news volume related to that category across entities. This concept may also be used for assessing core materiality, and may be extended recursively to industries, sectors, or other clusters for both dynamic materiality assessments and core materiality assessments.

In various embodiments, observables 406 may comprise news articles or other content that are analyzed by distributed computing cluster 102 to isolate textual passages concerning entity 402 with regard to a particular feature of interest 404. Distributed computing cluster 102 may analyze the isolated textual passage for a degree (i.e., magnitude) and polarity (positive or negative) of sentiment to produce a sentiment measurement. The sentiment score may be numerically comparable to similar sentiment measurements generated for other entities with respect to the same feature of interest 404. The numerical degree and polarity of the sentiment may be determined using natural language processing techniques to identify text relating to entity 402, feature of interest 404, and ranked words (e.g., where superlatives have greater weight than neutral terms), which may be processed algorithmically using techniques to determine the numerical characterization.

In various embodiments, suitable processing techniques may include, for example, lexicon-based algorithms, and learning-based algorithms. More generally, approaches to sentiment analysis can be grouped into three main categories: knowledge-based techniques, statistical methods, and hybrid approaches. Knowledge-based techniques may classify text by affect categories based on the presence of unambiguous affect words such as happy, sad, afraid, and bored. Some knowledge bases may not only list obvious affect words, but also assign arbitrary words a probable "affinity" to particular emotions. Statistical methods may leverage elements from machine learning such as latent semantic analysis, support vector machines, "bag of words", "Pointwise Mutual Information" for Semantic Orientation, and deep learning. Machine training may thus then be applied using known data segments, textual, or otherwise, to steer the learning system to efficiently capture, categorize, and evaluate such signals with respect to entities of interest found within incoming data streams such as those from news sources.

In various embodiments, more sophisticated methods may be leveraged to detect the holder of a sentiment (i.e., the person who maintains that affective state) and the target (i.e., the entity about which the affect is felt). To mine the opinion in context and get the feature about which the speaker has opined, the grammatical relationships of words may be used. Grammatical dependency relations may be obtained by deep parsing of the text. Hybrid approaches may leverage both machine learning and elements from knowledge representation such as ontologies and semantic networks in order to detect semantics that are expressed in a subtle manner, for example, through the analysis of concepts that do not explicitly convey relevant information but are implicitly linked to other concepts that do. Results of these analyses may be converted into a score that characterizes the observable 406 (e.g., the news article) with regard to the feature of interest 404 being observed relative to entity 402.

In various embodiments, observables 406 may comprise images including still images, moving images, satellite images, or ground-based images. Distributed computing cluster 102 may sift images to isolate known visual features concerning a particular entity with regard to a feature of interest 404. Examples of observables 406 (e.g., images) may include smokestacks with observable levels of pollution being expelled over time as a visual indicator of a feature of interest 404 (e.g., air pollution). Distributed computing cluster 102 may analyze an image for a degree and polarity of sentiment, numerically comparable to such sentiment measurements made upon other entities with respect to the same feature of interest 404. The numerical degree and polarity of sentiment may be determined using image processing techniques to identify objects within the image relating to entity 402 and/or feature of interest 404. Known machine learning image processing techniques may include "Region-Based Convolutional Neural Networks" or "You Only Look Once" algorithms applied for object detection, image classification, object localization, object detection, and object segmentation.

In various embodiments, distributed computing cluster 102 may process entity 402 and/or feature of interest 404 algorithmically as described above to determine the characterization within known tabulations of detected objects and their measurable sentiment relative to the feature of interest. Results may be converted into a score that characterizes the observable 406 (e.g., the image) with regard to the feature of interest 404 (e.g., air pollution) being observed relative to entity 402.

In various embodiments, the dynamic materiality distribution for each entity 402 from a collection of entities may constitute a signature for each entity 402 based upon its empirically determined dynamic materiality distribution. For example, the levels of observed attention upon the features of interest 404 of an entity (with all features of interest 404 being common across entities) can be sequenced by magnitude or importance (e.g., the amount of news about a particular feature of interest 404 of a company such as employee satisfaction relative to the amount of news about other features of interest 404).

In various embodiments, ordering or sequencing may result in a dynamic signature for the entity. The dynamic signature may be used to affinitize entity 402 with other entities having similar signatures. Boundaries of similarity may be used to create clusters, and clusters themselves may be assigned dynamic signatures based upon their constituents. Similar clustering and signature assignment may be applied at various levels of hierarchy. In that regard, entities may be dynamically clustered using the above techniques. The constituents within industries or sectors may thus change in response to either the dynamic signature of the sector or industry changing or the dynamic signature of constituent entities changing.

In various embodiments, distributed computing cluster 102 may cluster and assign signatures to the clusters generated to produce an empirical classification system. Distributed computing cluster 102 may affinitize signatures using metric and clustering techniques such as Levenshtein Distance agglomerative clustering applied to the order of the features of interest 404 in the signature, or such as multi-dimensional clustering applied to the magnitude observed for each feature of interest 404 as independent axes in a high-dimensional space.

In various embodiments, distributed computing cluster 102 may group entities based on dimensions such as region, size, or industry to generate signatures for the group of entities. The signatures for a region group comprising the aggregated dynamic materiality for entities within countries of the region, for example, may reflect the characteristics that are most material in the region. The materiality signature for the region may be used to weight or score ESG signals.

In various embodiments, magnitudes or importance may be polarized to identify additional distinguishing possibilities as positive or negative behavior with respect to the set of common features of interest 404 being observed. For example, entity 402 may be a fossil fuel company with a large quantity of observables 406 relating to a feature of interest 404 in the form of greenhouse gas emissions, yet the attention would be construed as negative. Continuing the example, another entity 402 may be a solar energy company with a large quantity of observables 406 viewed as mitigation to greenhouse gas emissions (feature of interest 404), and the attention would be construed as positive. Polarization may thus enrich the clustering space, distinguishing positive and negative entity behavior.

In various embodiments, classifications may be updated in real-time, hourly, daily, weekly, monthly, annually, irregularly, or on any desired update frequency. Similarly, classifications may be calculated continually and updated in response to a magnitude of change in the components of the vector describing a classification exceeding a threshold value. Observations may also be made regarding shifts in the constituents (e.g., entities 402 from a collection of entities) as being signals of changing emphasis of the features of interest 404 of entities. For example, distributed computing cluster 102 may identify increasing or decreasing attention to features of interest 404 over time signaling changes in behavior.

In various embodiments, distributed computing cluster 102 may similarity map dynamic materiality classifications to conventional classifications for comparison and calibration. These mappings can be established by first ascertaining the dynamic signatures of the groupings within systems (such as industries within SASB Sustainable Industry Classification System [SICS], other conventional classification systems which characterize industries and sectors, or non-conventional classification systems such as regional or country-based grouping) by mathematically aggregating the signatures of the constituents of each grouping to a signature representing the grouping. Then from the pool of signatures within the dynamic materiality classification system, those best approximating the conventional group signatures would be found, thus linking the two classification systems. Alternatively, a grouping within one system can be sought that overlaps in constituents with that of the other system. Performing this across all groups would then create a mapping between the two classification systems. Such mappings then establish an informative relationship between conventional systems and dynamic materiality-based systems.

In various embodiments, generating similarity mappings between clusters with signatures may include computing a similarity metric between two clusters. The similarity metric may include, for example, a weighted sum or product of the constituent overlap extent between the two clusters and the similarity metric of the signatures themselves (e.g., Levenshtein distance or other known metric between strings). The resulting combined similarity metric may be applied between all clusters in the collection to produce a similarity matrix, with clusters from one classification system along one axis and clusters from the other classification system along the second axis. An optimal, lowest-cost path from the top row to the bottom row through the matrix (touching each row and each column only once) may correspond to the optimal mapping between the two classification systems.

In various embodiments, distributed computing cluster 102 may apply clustering and similarity techniques to finding affinity between entities, or clustered collections of entities, with predefined areas of interest also characterized by pre-setting the materiality signatures and distributions that best describe the entities or clustered collections of entities. For example, distributed computing cluster 102 may start with a predefined materiality signature or distribution, relatively weighing features related to the environment to describe the concerns about climate change. The dynamic signatures identified using process 400 for various entities may be similarity tested with those of the climate change "ideal" as a measure of best adherence to climate concerns.

Figure 5:
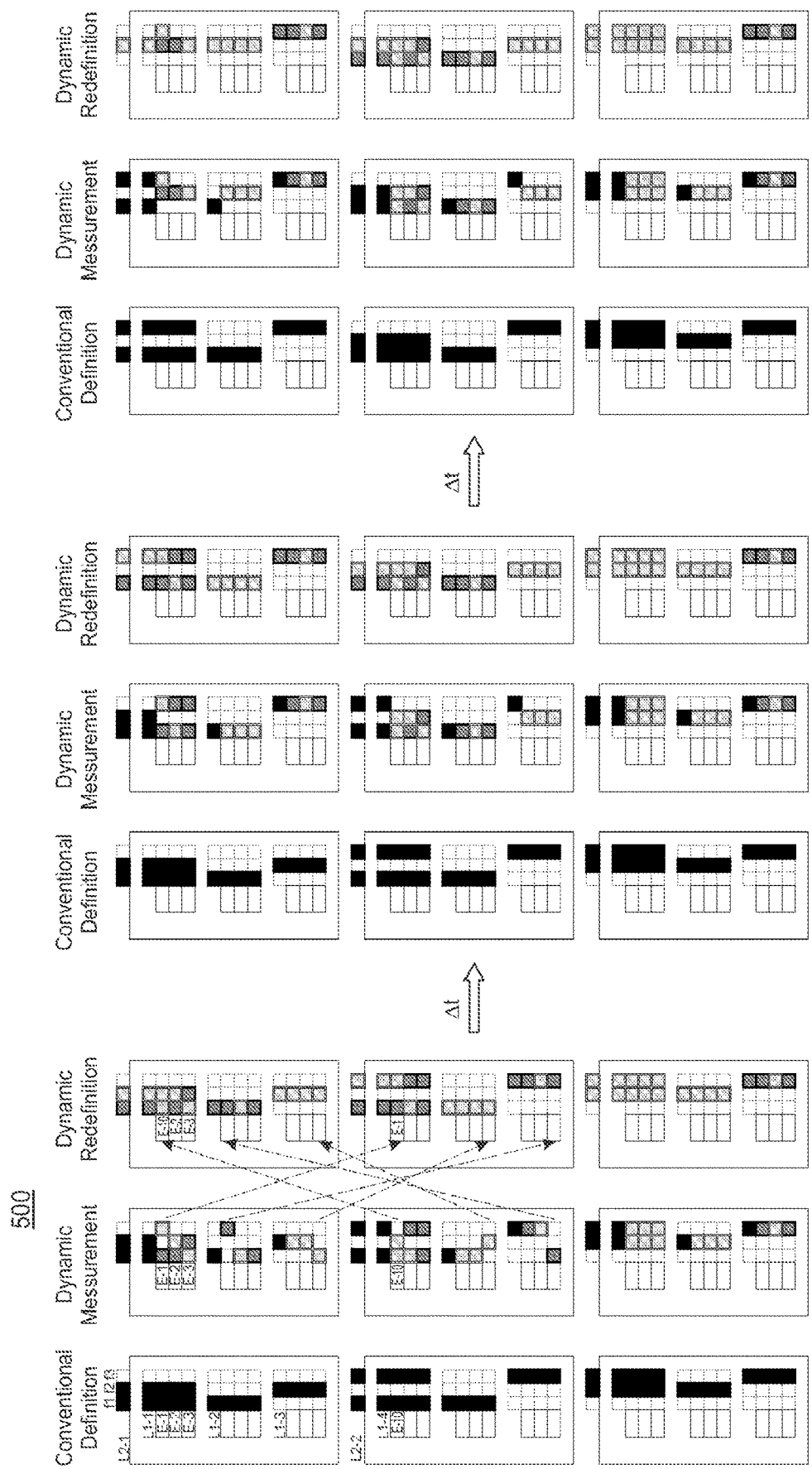
FIG. 5 illustrates an exemplary progression from an original static materiality framework to a dynamically adapted materiality framework, in accordance with various embodiments.

Referring now to FIG. 5, a schematic 500 is shown depicting differentials between conventional materiality and classifications contrasted with those produced by dynamic measurements changing through time. Dynamic measurements and classifications tend to lead conventional frameworks over time in terms of changes and accuracy. Dynamic classifications and measurements may thus indicate possible future changes to the composition of the conventional framework. In that regard, schematic 500 may be described as a depiction of embodiments described herein.

In various embodiments, the larger rectangles labeled L2 (e.g., L2-1 and L2-2 up to L2-N for any desired number N of groupings) may represent higher level groupings or clusters such as, for example, sectors containing industries. The smaller groupings or clusters labeled L1 (e.g., L1-1, L1-2, L1-3, L1-4 up to L1-N for any desired number N of groupings) within the larger rectangles labeled L2 may represent more granular groupings or clusters such as, for example, industries or peer groupings within a sector. Atomic entities labeled E (e.g., E1, E2, E3 up to EN for any desired number N of entities) may be grouped together in the smaller groupings labeled L1. Atomic entities may be entities described herein such as, for example, firms, companies, nonprofits, organizations, or other individual entities.

In various embodiments, features of interest 404 (from FIG. 4) may be assessed with respect to each level of grouping (e.g., sector, industry, entity). Although three features of interest 304 have been selected for sake of example (f1, f2, and f3), any desired number of features may be assessed and evaluated for dynamic materiality distribution, dynamic signatures, and/or dynamic classification.

In various embodiments, graphical fill levels in the squares where the two dimensions intersect indicate materiality. Conventional materiality is represented in solid black, and dynamic materiality is represented in shades of gray depicting the intensity of news or other references relevant to an entity, industry, or sector.

In various embodiments, each time block contains three columns entitled "Conventional Definition", "Dynamic Measurement", and "Dynamic Redefinition." Conventional Definition represents conventional materiality definitions and classifications (such as GICS, SICS, etc.). Dynamic Measurement represents the dynamic materiality readings found for each entity across all the features. Such readings then lead to more fitting combinations and groupings of the entities per the empirical material distributions and signatures found. Entities and groupings can be adjusted in response to the material distributions and signatures in the form of reassigning entities to groups of entities with similar signatures.

In various embodiments, dynamic materiality distributions and signatures may be measured at any desired cadence. The updates may be observed to identify differences between previously generated dynamic materiality distributions and signatures and current dynamic materiality distributions and signatures. The updates may also be observed to identify differences between current dynamic materiality distributions and signatures and prevailing conventional definitions in force at the time of the reading (e.g., SASB, SICS).

In various embodiments, observation over time may show that dynamic materiality distributions and signatures serve as leading indicators for changes to conventional definitions over time. In FIG. 5, the change over time is illustrated in the materiality distribution shown in the new Conventional Definition column in the third time block, which has changed to reflect the previous Dynamic Redefinition. Real world examples of this phenomenon include the rise of climate concerns to prominence as core conventional materiality evolved in recent times.

Figure 6:
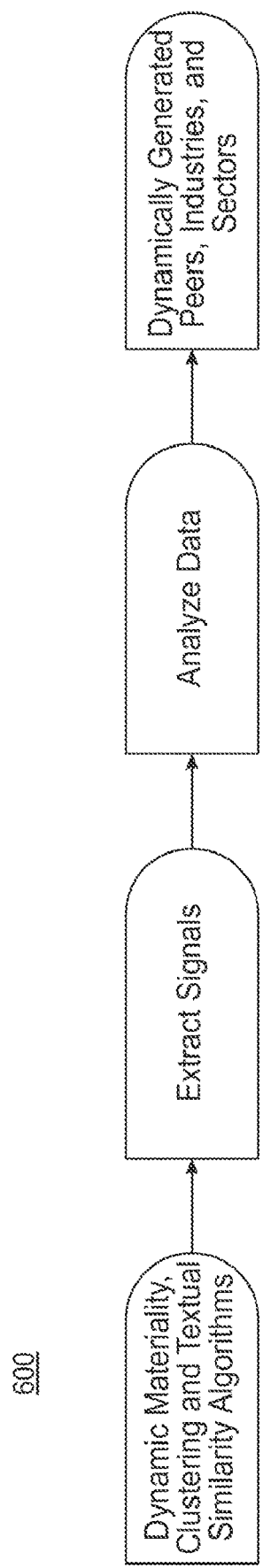
FIG. 6 illustrates an exemplary data processing architecture for dynamic signature generation and dynamic categorization, in accordance with various embodiments.

Referring now to FIG. 6, data processing architecture 600 is shown for extracting and analyzing signals in dynamic and textual materiality to dynamically identify peers and otherwise categorize entities into industries and sectors using distributed computing cluster 102, in accordance with various embodiments. The data processing architecture 600 may take dynamic materiality and dynamic similarity as inputs and extract signals. The signals may be analyzed as described above to evaluate entities. Results may include continuously updated ontology graph relationship between companies, peer groups, industries, and sectors. Entities may be classified into more than one peer group, industry, and sector at the same time if appropriate. Data processing architecture 600 may be scalable and objective. Evaluating materiality from signals allows a holistic assessment of companies that incorporates public perception, which can move markets.

In various embodiments, data processing architecture 600 may be used in a variety of business use cases to solve various problems. For example, a classification system analyst may use data processing architecture 600 to better inform them on re-classifying or classifying a new company into a peer group, industry, or sector in a traditional framework to achieve a more accurate classification system. An automated trading system engineer may use this system in the market-making pricing engines on exchanges to better understand correlations and relationships between companies, peer groups, industries, and sectors. A researcher may use this system to better write research on relevant peer groups and understanding the ontology of relationships between peer groups, industries, and sectors. These techniques may also be applied to domains outside business, finance, and investing to any classification problem more generally in instances, for example, when trying to classify geopolitical events or groups together.

Figure 7A:
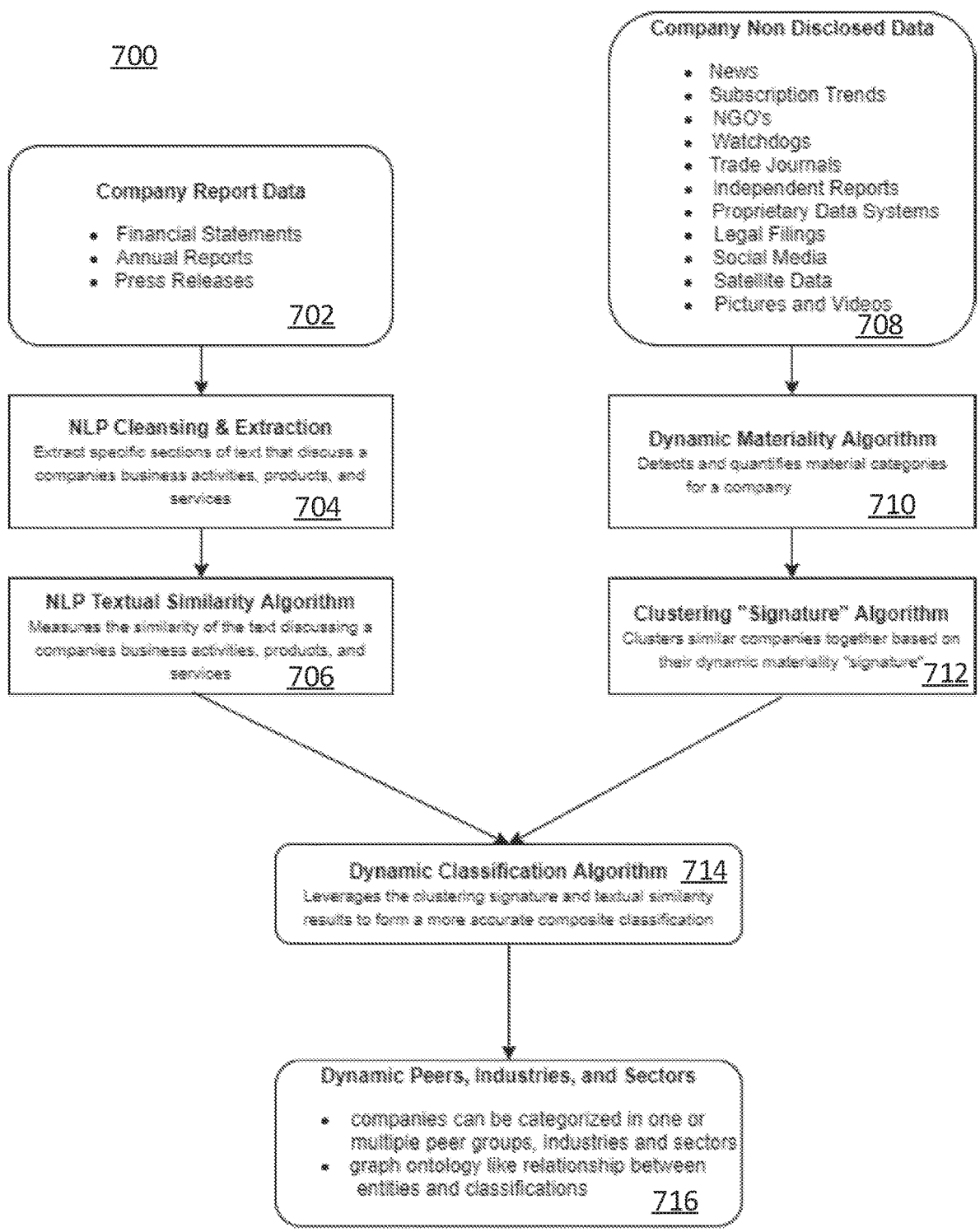
FIG. 7A illustrates an exemplary process for ingesting entity-reported data and non-entity-reported data to generate signatures for and categorize entities, in accordance with various embodiments.

Referring now to FIG. 7A, process 700 is shown for ingesting entity-reported data and non-entity-reported data to dynamically classify or categorize an entity, in accordance with various embodiments. Process 700 may run on distributed computing cluster 102 to generate signatures based on unstructured data with textured similarity on structured data (e.g., company-reported data).

In various embodiments, process 700 may ingest company-reported data in step 702. Company-reported data may be cleaned and extracted in step 704, and company reported data may also be processed to identify textual similarities. Process 700 may thus comprise multiple steps in processing company reported data. For example, process 700 may extract business activities, products, and services related to an entity or company in step 704. Process 700 may then find entities or companies with similar signatures in step 706 based at least in part on the business activities, products, and services extracted in step 704. Process 700 may thus identify similar entities by evaluating similarities in limited and particularly selected portions of company-reported text.

In various embodiments, process 700 may also ingest non-company-reported data in step 708. Non-company-reported data may be in the form of observables relating to features of interest as described above (with reference to FIGS. 3-5, for example). Process 700 may assess dynamic signatures for entities in step 710 (using techniques described above with reference to FIGS. 3-5, for example). Process 700 may also cluster entities in step 712 based on their dynamic signatures.

In various embodiments, process 700 may use textual similarity and the clustering signature to form a more accurate composite classification in step 714. The composite classification may thus be based on either or both company-reported data (e.g., information on 10k or 990 forms) and non-company-reported data (e.g., media coverage). By using the combination of company-reported and non-company-reported data, distributed computing cluster 102 may generate a more reliable dynamic classification signal.

In various embodiments, the signal may be used to dynamically cluster or categorize entities, industries, and/or sectors in step 716. The signal may also be used for segmentation including by region, continent, country, market capitalization range, or other suitable segmentation grouping. Using the dynamic signature in conjunction with textual similarity of an entity may result in increased accuracy. Textual similarity may be particularly relevant when relating to an entity's activities, products, services, actions, etc. In that regard, text unrelated an entity's activities, products, services, and/or actions may be ignored when parsing company-reported data in process 700 to identify textual similarities.

In various embodiments, process 700 may identify synonyms and match phrases with similar meanings. Process 700 may thus match entities with similar activities, products, and services extracted from unstructured text that uses the synonyms or differing phrases that would otherwise not be an exact match. Process 700 may refer to a synonym dictionary to match synonyms and phrases with similar meanings. For example, process 700 may detect a first company referencing "electric vehicles" and second company referencing "EVs." Process 700 would identify that EV is a synonym for electric vehicles and thus identify the similarity between two companies selling the same product but under a different name.

In various embodiments, some subset of the same signals that express unique dynamic material signatures of a company entity, industry, sector, region, country, or other cluster, may exhibit an outsized and enduring contribution to total signal volume across companies or entities, such that these signals are regarded as core material signals among the total set of signals. This introduces the concept of "core materiality" in accompaniment with dynamic materiality.

In various embodiments, methods of detecting similarity or semantic affinity between companies (such as product similarity, service similarity, similarities in lines of business, etc.) may be expanded beyond textual similarity to include additional natural language similarity detection techniques such as, for example, lexicon-based algorithms (with lexicons constructed to articulate known business areas), synonym dictionaries, learning-based algorithms, latent semantic analysis, support vector machines, "bag of words", "Pointwise Mutual Information" for Semantic Orientation, and deep learning.

For example, in section 1 of a 10k report companies describe their business. Comparing textual similarities of entities' self-described businesses, along with the dynamic signature of the entities, would likely increase confidence in the relationship between two entities. Although 10k reports are used as a commonly known example, other mandatory reports, optional reports, press releases, or other self-published information from an entity may be used for comparison with other entities.

Figure 7B:
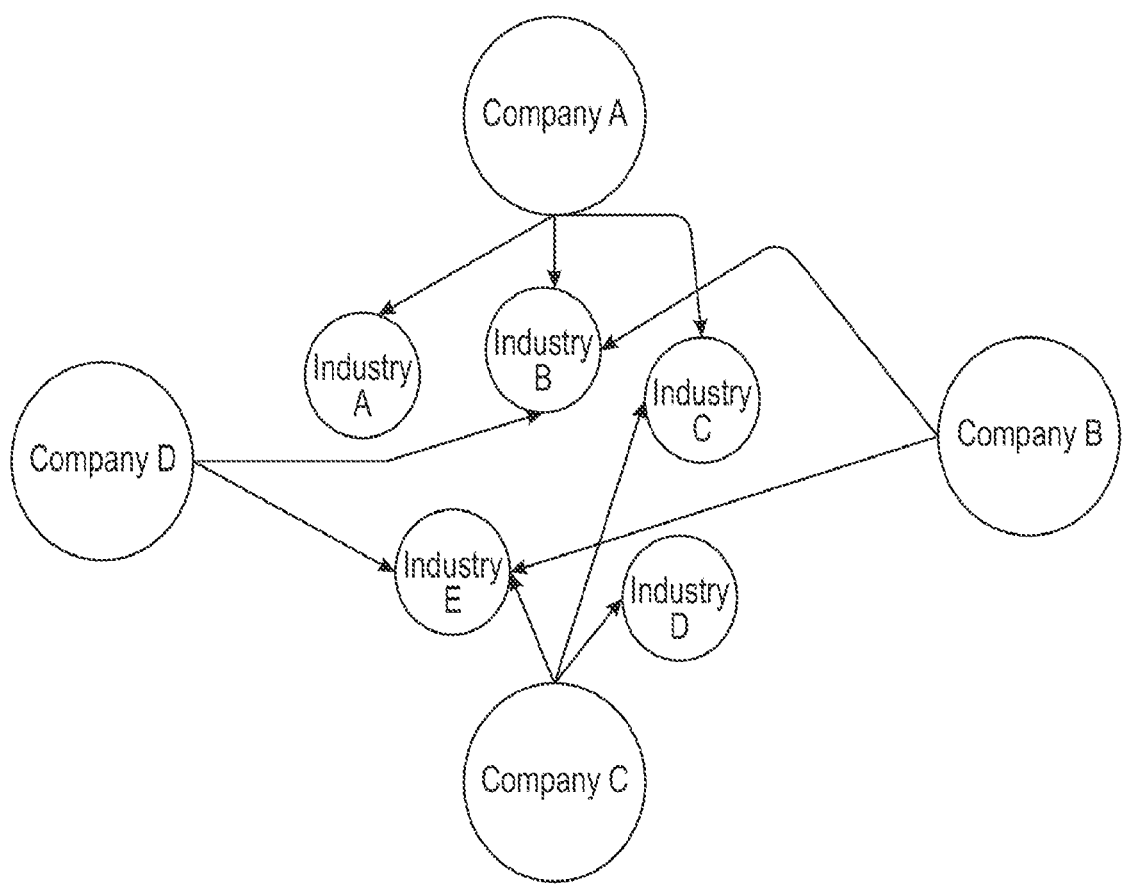
FIG. 7B illustrates an exemplary ontology generated by from dynamically categorizing entities, in accordance with various embodiments.

In various embodiments, separate signatures may be generated with a first signature based on company-reported data and a second signature based on non-company-reported data. Distributed computing cluster 102 may compare the two signatures to measure how close a company's reported data reflects its actions as manifested in non-company-reported data. FIG. 7B depicts ontology 720 of dynamically generated relationships, which may include complex relationships between entities discovered as a result of process 700 of FIG. 7A.

Figure 8:
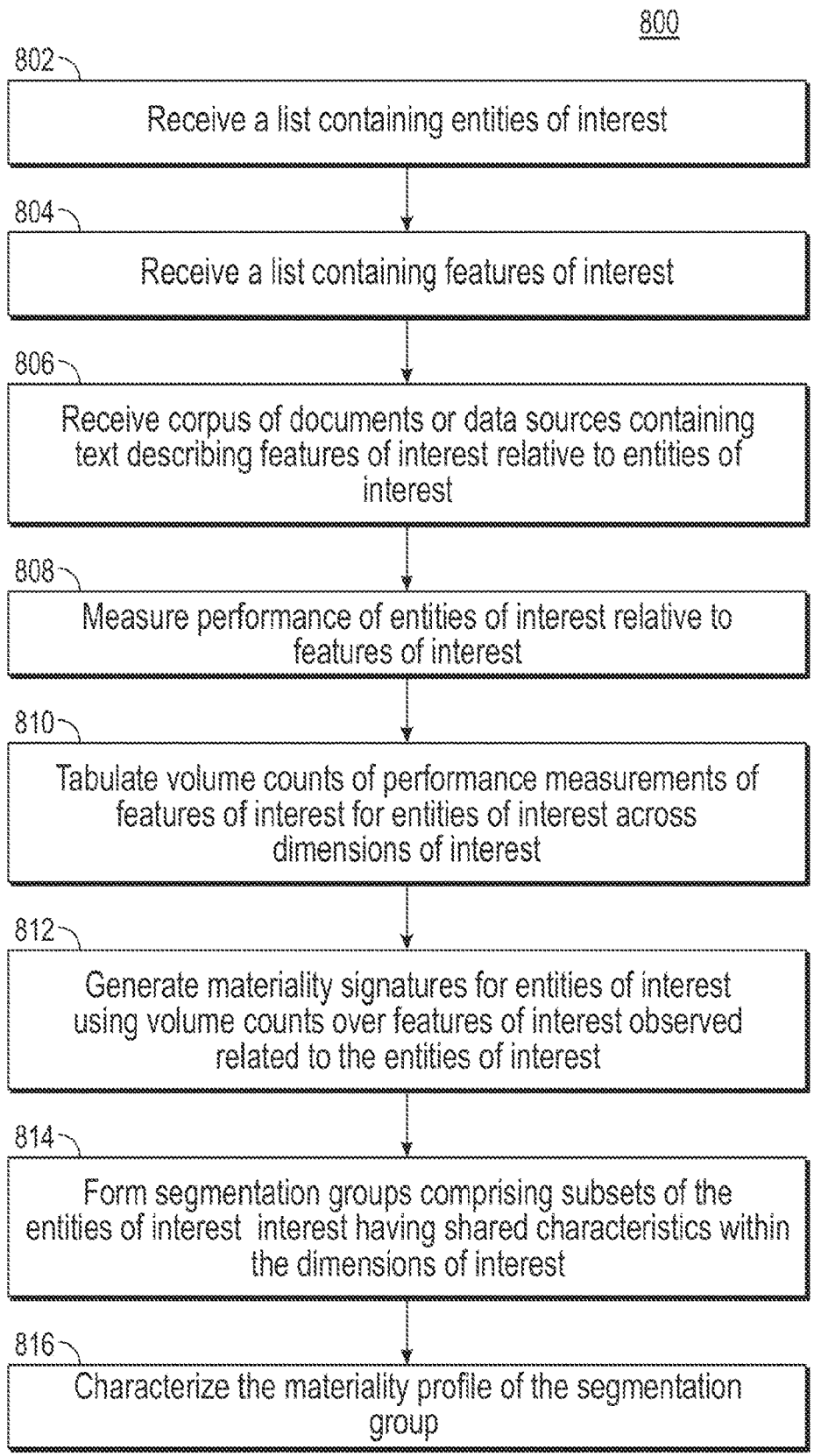
FIG. 8 illustrates an exemplary process for assessing materiality in a segmentation or dimension of interest, in accordance with various embodiments.

Referring now to FIG. 8, a process 800 is shown for identifying a materiality profile for a dimension or segmentation using distributed computing cluster 102 (of FIG. 1), in accordance with various embodiments. Distributed computing cluster 102 may receive a list of entities of interest (Step 802). The list may articulate a universe of entities of interest including companies and organizations within known segmentations or dimensions of interest. Examples of segmentations or dimensions of interest include regions, countries, continents, sectors, industries, market capitalization ranges, and time ranges relevant to a company or organization.

In various embodiments, distributed computing cluster 102 may receive a list of features of interest (Step 804). The list may articulate a collection of features of interest including standards, behavioral categories, performance categories, and credit worthiness, for example. Distributed computing cluster 102 may receive a corpus of documents (Step 806). The features of interest may be a topic in a subset of the corpus of documents. The corpus of documents may include, for example, news items, regulatory filings, industry publications, journal articles, news articles, periodical publications, segments of books, bibliographical data, market data, social media feeds, converted videos, or other publications or documents. In various embodiments, distributed computing cluster 102 may measure the performance of each of the entities of interest relative to each of the features of interest (Step 808). Distributed computing cluster 102 may apply natural language processing, ontological, and/or sentiment quantification techniques to the corpus of documents to ascertain the performance measurements of entities relative to the features of interest. Distributed computing cluster 102 may also tabulate volume counts of the performance measurements of each feature of interest for each entity of interest across all dimensions of interest (Step 810).

In various embodiments, distributed computing cluster 102 may generate materiality signatures for each entity of interest (Step 812). The materiality signatures may be generated for an entity by using the spectrum of volume counts over the features of interest observed upon the entity. Distributed computing cluster 102 may form segmentation groups containing subsets of the entities of interest with shared characteristics within the dimensions of interest (Step 814). Segmentation groups may be formed on characteristics of entities such as country of operations, region of operations, market cap size, industry, sector, or other characteristics suitable for grouping entities sharing the characteristic. Collectively, the entities within the segmentation groups may exhibit characteristics such as, for example, similar materiality signatures, volume dominant features of interest, or sizes of subsets.

In various embodiments, the distributed computing cluster may characterize the overall materiality profile of the segmentation group (Step 816). The materiality profile of the segmentation group may be used to dynamically assess which features of interest are becoming more or less material within the segmentation group. For example, data privacy was a heavily weighted factor in the European Union until the adoption of strong data privacy laws such as the General Data Protection Regulation (GDRP), after which the weight of data privacy reduced in Europe but remained high in other regions such as the United States. The materiality profile of the regionally segmented group of companies based in Europe thus shifted to deemphasize data privacy in response to data privacy being subject to strong legal controls.

Systems and methods of the present disclosure generate dynamic, rapidly updated, continuous (versus discrete or binary) dynamic materiality distributions to assess materiality within a group of entities. Dynamic materiality distributions may be generated for entities and industries in a predetermined segmentation such as, for example, region, industry, entity size, or other subgrouping to accurately identify factors material to entities in the segmentation or dimension. The materiality profile across an entire segmentation group comprising a collection of entities, such as all entities operating in a country or region, may also be evaluated. Systems and methods of the present disclosure may also generate dynamic, rapidly updated, continuous entity classifications. These dynamic materiality distributions and dynamic classifications can be built using pre-existing categorizations of features of interest such as the SASB standard sustainability categories. The distributions may also be generated over time as content regarding entities flows into the system by dynamically classifying entities into groups with similar entities and dynamically assessing materiality of the features of interest 304 with respect to the entities. In that regard, systems and methods of the present disclosure analyze incoming observables to determine which observables are relevant to a given entity or group of entities. Systems and methods of the present disclosure thus result in better informed decisions made by observers and stakeholders in related entities and entity classes.

Systems and methods of the present disclosure may generate a core material subset of features of interest 304 that demonstrate outsized and enduring contributions to total volume, identified over time as content regarding entities and features of interest 304 flows into the system.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Devices, systems, and methods are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or device that comprises a list of elements does not include only those elements but may include other elements not expressly listed or inherent to such process, method, article, or device.

What is claimed is:

1. A method for determining dynamic materiality, comprising:
   receiving, by a processor:
      information indicating a plurality of entities and a plurality of features; and
      a first plurality of items each containing a first text describing an entity in association with a feature, wherein the first plurality of items describe each entity in the plurality of entities and each feature in the plurality of features;
   determining, by the processor, for each of the first plurality of items, an item score of the entity described in association with the feature such that at least one item score for each entity of the plurality of entities is determined;
   determining, by the processor, for each entity of the plurality of entities, an entity score based on the at least one item score for each entity of the plurality of entities such that each entity is associated with one entity score;
   generating, by the processor, a materiality signature for each entity based on the entity score for that entity;
   displaying, by a graphical user interface, a graphical representation of the materiality signature for at least one of the plurality of entities;
   receiving, by the processor, a second plurality of items each containing a second text describing one of the at least one of the plurality of entities entity in association with one of the plurality of features;
   determining, by the processor, for each entity described in the second plurality of items, an updated entity score;
   generating, by the processor, an updated materiality signature for each entity described in the second plurality of items based on the updated entity score;
   determining, by the processor, for each entity described in the second plurality of items, a change in the materiality signature compared to the updated materiality signature; and
   when the change in the materiality signature for at least one of each entity described in the second plurality of items exceeds a threshold value.

2. The method of claim 1, wherein the item score is determined using a natural language processing technique to identify the first text relating to the entity.

3. The method of claim 2, wherein the natural language processing technique is configured to identify ranked words in determining the item score.

4. The method of claim 3, wherein the natural language processing technique is configured to utilize grammatical relationship between words in the first text in determining the item score.

5. The method of claim 1, wherein the item score is determined using an ontological quantification technique or sentiment quantification technique.

6. The method of claim 1, wherein the item score is associated with a sentiment measurement.

7. The method of claim 6, wherein the item score is associated with a degree and a polarity of the sentiment measurement.

8. The method of claim 7, wherein the degree of the sentiment measurement is calculated based on a total number of the first plurality of items that contain first text describing a particular entity of the plurality of entities in association with a particular feature of the plurality of features.

9. The method of claim 1, further comprising:
   receiving a third plurality of items containing images, moving images, satellite images, or ground-based images; and
   determining, by the processor, for each of the third plurality of items, an item score of one of the plurality of entities with respect to one of the plurality of features.

10. The method of claim 1, further comprising:
    forming, by the processor, a segmentation group comprising a subset of the plurality of entities, wherein the subset comprises at least two of the plurality of entities having shared characteristics with respect to at least one of the plurality of features; and
    displaying, by the graphical user interface, a materiality profile of the segmentation group.

11. The method of claim 10, wherein the shared characteristics are determined based on a natural language similarity detection technique.

12. The method of claim 11, wherein the natural language similarity detection technique is a lexicon-based algorithm.

13. The method of claim 11, wherein the natural language similarity detection technique is a synonym dictionary.

14. The method of claim 11, wherein the natural language similarity detection technique is a learning-based algorithm.

15. The method of claim 12, wherein the natural language similarity detection technique is a latent semantic analysis, a support vector machine, "bag of words," "Pointwise Mutual Information" for Semantic Orientation, or deep learning.

16. The method of claim 10, further comprising assigning a group signature to the materiality profile.

17. The method of claim 16, further comprising affinitizing the group signature with other group signatures using metric and clustering techniques.

18. The method of claim 17, wherein the metric and clustering techniques include Levenshtein Distance agglomerative clustering, and multidimensional clustering.

19. The method of claim 16, wherein the group signature includes an aggregated dynamic materiality for the subset.

20. The method of claim 1, further comprising comparing the materiality signature for the at least one of the plurality of entities with a static signature for calibration.

* * * * *